L. DREYFUS.
FAUCET.

No. 180,560. Patented Aug. 1, 1876.

WITNESSES.
Thomas J. Roach.
J. C. Hubbell

INVENTOR.
Leon Dreyfus
By H. N. Jenkins
ATTORNEY.

UNITED STATES PATENT OFFICE.

LEON DREYFUS, OF NEW ORLEANS, LOUISIANA.

IMPROVEMENT IN FAUCETS.

Specification forming part of Letters Patent No. 180,560, dated August 1, 1876; application filed June 6, 1876.

*To all whom it may concern:*

Be it known that I, LEON DREYFUS, a resident of the city of New Orleans, and State of Louisiana, have invented a certain new and useful Improvement in Faucets and Stop-Cocks; and I do hereby declare the following to be a full, clear, and correct description of the same, reference being had to the annexed drawing, making a part of this specification.

The improvements embraced in my device consist in providing faucets with rubber or other flexible bushings or linings, and in providing a means for regulating the flow of liquid through the same.

My invention dispenses entirely with the usual valves and valve-seats, and, as will hereinafter be more fully described, effectually precludes any possibility of a leakage of liquid through the same.

Figure 1:
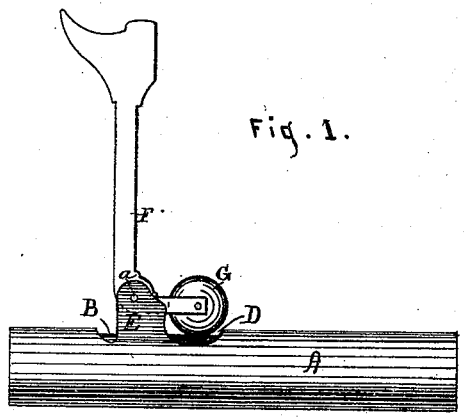
Figure 2:
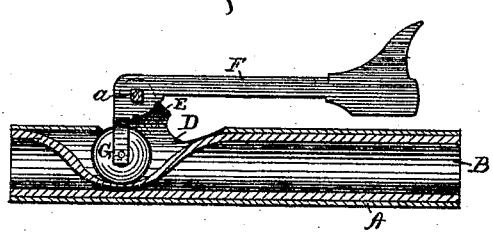

On the drawing, Figure 1 is a side view, and Fig. 2 a longitudinal section, of my invention.

A represents the outer casing or faucet proper, and B the hollow cylindrical rubber lining thereof. The upper side of the casing is provided with an opening, D, for exposing a certain portion of the outer circumference of the rubber lining, and on each side of this opening the casing is provided with lugs E for the reception of the rock-shaft $a$. On this shaft, midway between the bearings thereof, is keyed or otherwise secured a lever, F, the short end of which is bent to a right angle, and is provided with a yoke, between which a roller G, operates. The outer extremity of the long end of the lever is weighted, so that it may remain down when the faucet is closed.

It will thus be perceived that, inasmuch as there are no metal to metal bearings in my device, none of the metal can be wasted or worn away. This is a desirable result, especially in its application to vessels or casks from which muddy water or other earthy liquids are to be withdrawn.

Should the rubber at any time wear from the friction of the roller it can be partially turned so as to present a new surface, or it may be entirely removed and a new lining easily inserted in its place.

In order to insure a perfect lock when the faucet is closed, the pivot upon which the roller operates should be somewhat in advance of a right angle to the handle of the lever, as shown in the drawing. Were it otherwise—say, for instance, at or less than a right angle—a slight jar might at any time cause the locking device to be thrown back, thus opening and rendering the invention inoperative.

Having described my invention, what I claim as new, and desire to secure by Letters Patent, is—

A faucet, consisting of an outer casing, A, provided with an opening, D, and lugs E, an interior flexible tube or lining, B, the lever F, and roller G, the whole constructed and arranged substantially as described.

In testimony whereof I have hereunto set my hand.

LEON DREYFUS.

Witnesses:
H. N. JENKINS,
J. C. HUBBELL.